UNITED STATES PATENT OFFICE.

MAXIMILIAN STORP, OF HAMBURG, GERMANY.

MANUFACTURE OF TILES, PLATES, SLABS, &c.

SPECIFICATION forming part of Letters Patent No. 682,370, dated September 10, 1901.

Application filed May 29, 1901. Serial No. 62,370. (No specimens.)

*To all whom it may concern:*

Be it known that I, MAXIMILIAN STORP, manufacturer, of 13 Hammerbrookstrasse, Hamburg, in the Empire of Germany, have invented new and useful Improvements in and Relating to the Manufacture of Tiles, Plates, Slabs, and the Like, (for which patent applications have been made in Germany, filed April 6, 1901, and in Great Britain, filed April 12, 1901,) of which the following is a specification.

This invention relates to an improved process for the production of pressed gypsum slabs or plates. Heretofore such slabs or plates could only be produced by allowing the paste of gypsum and water to harden in a mold; but, as is well known, this material acts or binds very quickly, and it was therefore necessary that all the manipulations should be carried out as rapidly as possible. Notwithstanding, however, all possible speed it is impossible to press the plates or slabs before the plaster sets, while pressing of the plates after binding is obviously useless. It has been proposed to retard the setting of the gypsum by the addition of various substances, by which means the gypsum could be more leisurely prepared, but could not be pressed, as it is necessary to employ a large quantity of water to prevent it from binding too rapidly, while, moreover, the gypsum paste under pressure escapes through the joints of the molds. It has also been proposed to add certain substances to the plaster for the purpose of imparting greater strength thereto; and it is the object of this invention to produce a gypsum paste capable of being compressed and one which at the same time shall possess a high degree of hardness beyond that obtainable by pressing.

According to this invention I add to the gypsum one-fifth of its weight of chlorid of magnesium, the mixture being mixed with water in the ordinary manner, but so that the gypsum paste forms a thick mass and the paste formed into plates, slabs, tiles, and the like in the well-known plate-press machines heretofore used for manufacturing cement plates or terra-cotta slabs or tiles.

Slabs or plates manufactured in accordance with this invention possess after hardening a much higher degree of hardness and more compact texture than ordinary gypsum plates.

In order to impart a presentable appearance to the plates and to render their outer surface durable, they may be coated with a suitable varnish or soaked with paraffin or coated with a celluloid solution, and, if desired, the plate, tile, or the like may be previously formed with an appropriate design.

By my improved process it is possible to produce plates, slabs, tiles, and the like, having externally all the appearance of those made of clay; at a much lower cost, as the material is considerably cheaper, and especially because the cost of manufacture is reduced, the burning process required for ordinary clay plates or tiles being unnecessary.

The time necessary for the binding or setting of the gypsum is about four to six hours, while the gypsum paste prepared in accordance with this invention forms such a thick mass as to render it unable to escape through the joints of the mold. This property renders the mixing of the material by machinery possible.

What I claim as my invention, and desire to secure by Letters Patent, is—

The hereinbefore-described process for the production of pressed gypsum tiles, plates slabs or the like, consisting of adding chlorid of magnesium to the gypsum in the proportions specified, mixing the whole with water to a thick paste and pressing the same to form plates the outer face of which, after hardening is covered with a weatherproof coating substantially as hereinbefore described and for the purpose specified.

In testimony whereof I affix my signature in presence of two witnesses.

MAXIMILIAN STORP.

Witnesses:
 E. H. L. MUMMENHOFF,
 J. CHRIST HAFERMANN.